United States Patent [19]

Levine

[11] Patent Number: 4,524,526
[45] Date of Patent: Jun. 25, 1985

[54] APPARATUS AND METHOD FOR INERTIAL MEASUREMENT OF PIPELINE DEFLECTION

[75] Inventor: Seymour Levine, Topanga, Calif.

[73] Assignee: Litton Systems, Inc., Beverly Hills, Calif.

[21] Appl. No.: 443,481

[22] Filed: Nov. 22, 1982

[51] Int. Cl.³ .............................................. E21B 7/00
[52] U.S. Cl. ....................................... 33/312; 33/302; 33/313; 33/178 F
[58] Field of Search ................. 33/302, 304, 313, 312, 33/178 F, 178 E, 114, 318, 320, 174 R; 73/151, 432 R, 432 B

[56] References Cited
U.S. PATENT DOCUMENTS

| | | | |
|---|---|---|---|
| 2,580,485 | 1/1952 | Thornton | 33/322 X |
| 2,940,178 | 6/1960 | Krueger | 33/313 |
| 3,131,292 | 4/1964 | Tobin | 33/322 X |
| 3,460,028 | 8/1969 | Beaver et al. | 33/312 X |
| 3,483,746 | 12/1969 | Bers | 33/322 X |
| 3,786,684 | 1/1974 | Wiers et al. | 73/432 R |
| 3,964,171 | 6/1976 | Gambini et al. | 33/178 F X |
| 4,021,925 | 5/1977 | Loftus | 33/178 E |
| 4,361,192 | 11/1982 | Trowsdale | 33/312 X |

Primary Examiner—Harry N. Haroian
Attorney, Agent, or Firm—Elliott N. Kramsky

[57] ABSTRACT

Apparatus and a method for detecting deflections along the length of a pipeline. A plurality of measurements of inertial attitude are made along the length of the pipeline over time by means of apparatus, including sensors, associated with a pipeline pig. Thereafter, by comparing a time sequence of such measurements, points of flexure are accurately located and identified.

13 Claims, 6 Drawing Figures

4,524,526

APPARATUS AND METHOD FOR INERTIAL MEASUREMENT OF PIPELINE DEFLECTION

BACKGROUND OF THE INVENTION

1. Field of the Invention.

The present invention pertains to methods and apparatus for detecting localized pipeline deformations. More particularly, this invention pertains to the use of attitude-sensing techniques to detect such deformations.

2. Description of the Prior Art

The monitoring of pipeline flexure over time provides a useful aid to protection of a surrounding ecological environment. Changes in localized pipeline curvature can result from variable soil, temperature and exogenous forces (such as earthquake) and such changes over time provide an advance indication of pipeline stressing and fatigue that could result in rupture. Often early detection of problem areas along the length of a pipeline allows repair, such as the "springing" of a flexed segment of pipeline, to be affected at minimal cost. By accurately locating points of excessive flexure, preventive maintenance can often be rapidly effected, avoiding additional damage to the pipeline.

In Arctic environs, such as that of the Alaska pipeline, non-static conditions along a 900 mile length can result from the flow of oil at temperatures ranging from 20 degrees to 145 degrees Fahrenheit through a pipeline that is surrounded by permanently frozen (permafrost) soil. Such a flow can thaw subsoil in proximity to the pipeline and/or to various supporting structures to sink or shift pipeline sections into attitudes that result in localized curvatures in excess of desired tolerances. The cold temperatures associated with liquified gas cause similar pipeline problems.

It is, therefore, highly desirable to detect excessive curvatures within pipelines prior to failure and a number of systems have been proposed for this purpose. Two methods have attained primary significance in the measurement of curvatures along relatively long pipelines. The first method involves the welding of a plurality of regularly spaced bars along the pipeline. The bars extend through the surface of the soil, providing an indication of the height of the pipeline section to which it is welded. Survey techniques determine changes in the heights of the bars over time, indicating changes of curvature at preselected points along the pipeline. This method is relatively expensive and, due to the employment of manual survey techniques, subject to human error. Additionally, the positioning of bars at a plurality of points along the pipeline produces data that is inherently non-continuous. Thus, a significant number of bars must be utilized to avoid the probability of non-detection of non-monitored points between bars. Additionally, severe weather conditions hamper efforts to survey accurately.

The other method primarily employed is in accordance with the disclosure of U.S. Pat. No. 3,882,606 of Kaenel et al for "Method and Apparatus for Measuring Curvature and Curvature Variations in Pipelines and the Like". In that patent there is disclosed a pipeline "pig" having a plurality of wheels engaged to its opposed sides. The wheels, which act as sensing wheels, travel the inner surface of the pipe. Pipeline curvature is determined by comparison of the distances traversed by wheels located at opposite sides of the pig. In the event that a curvature exists in a section of the pipeline, it will be reflected in a differential between the lengths traversed by the opposed wheels. This method is subject to a number of error-inducing factors including wheel slippage, pipe irregularities, and tracking errors. Additionally, unequally distributed wrinkling along the inner surface of the pipe can effect the accurate measurement of curvature by this method.

Thus, it is desirable to provide new apparatus and methods for measuring localized curvatures throughout the length of a pipeline.

SUMMARY OF THE INVENTION

The present invention provides new and improved apparatus and a method that solve the foregoing and additional shortcomings of the prior art. In accordance with the method provided by the present invention, a plurality of measurements of pipeline attitude as a function of position are taken over time. Such measurements having been taken, comparisons of pipeline attitude as a function of position are then made to locate points of flexure along the length of the pipeline. Apparatus provided in accordance with the invention includes means for making a plurality of measurements of attitude along the length of the pipeline and means for comparing the plurality of measurements to locate changes in attitude.

In accordance with the invention there is further provided a curvature pig including a cylindrical pig housing. At least one cup encircles the housing for translating a flow of fluid through the pipeline into motion of the pig. There is further provided means for detecting the attitude of the pipe with respect to inertial space.

The foregoing features and advantages of the present invention will become evident from the following detailed description which is accompanied by a set of figures that serve to illustrate the invention in a preferred embodiment. In the figures, numerals corresponding to those of the detailed description indicate the various features of the invention, like numerals referring to like features throughout.

DETAILED DESCRIPTION

Figure 1:
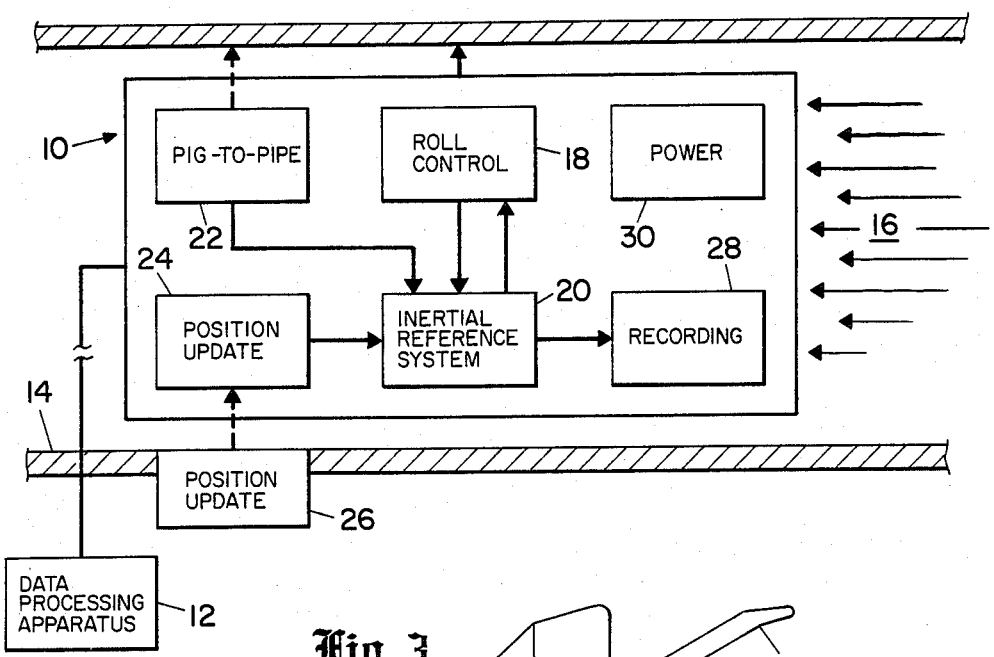
FIG. 1 is a system schematic drawing of an inertial system for measurement of pipeline curvature according to the invention.

Turning now to the drawings, FIG. 1 is a schematic view of a system for measuring pipeline curvature according to the present invention. The functional components of such a system comprise a plurality of transportable elements internal to an otherwise-conventional pipeline pig 10 and data processing apparatus 12 that is "off line" in the sense that it is not transported by the pig 10. The pig 10 is propelled through a pipeline 14 by the flow of the appropriate pipe transport fluid, such as oil or gas. It will be seen in the cross-sectional view of such a pig according to the invention shown in FIG. 2 that associated polyurethane "cups" provide a means for translating a flow of fluid 16 into movement of the pig 10 through the pipeline 14.

A roll control system 18 is provided for stabilizing the pig 10. The system 18, which may comprise any of a number of conventional stablizing means, provides a reliable reference for the measurements of pig-to-pipeline and pig-to-inertial space attitude that are taken by sensors mounted on the pig 10 during travel through the pipeline 14. Such sensors are discussed in detail, infra.

An inertial attitude-and-heading reference system 20 and pig-to-pipe attitude sensor 22 continuously provide pig-to-inertial space and pig-to-pipe attitude (azimuth and pitch) data during operation. In addition, a position update transducer 24 senses position reference data 26, allowing the user to reference all attitude data to pipeline location. As will be shown, position reference data 26 is provided in the form of a plurality of welds located throughout the pipeline 14. Such welds cause discontinuities in the profile of the interior of the pipeline 14 that are sensed as perturbations in the signal output of the position update transducer 24. The acquired attitude and position data are continuously applied to a recording system 28. A power system 30 located aboard the pig 10 acts to energize the various electrical sensors.

Figure 2:
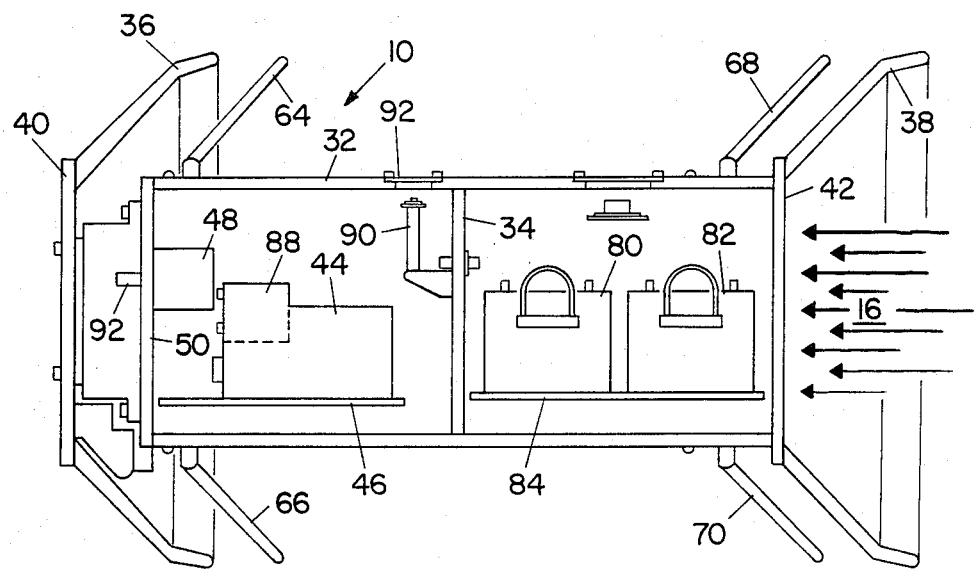
FIG. 2 is a side sectional view of a pipeline pig adapted to the measurement of pipeline curvature in accordance with the present invention.

FIG. 2 is a side sectional view of a curvature pig according to the present invention that incorporates the functions set forth in the system schematic diagram of FIG. 1. The pig 10 comprises a generally cylindrical housing 32 divided into fore and aft sections by a circular bulkhead 34. Polyurethane cups 36 and 38 bonded to metallic end plates 40 and 42 are dimensioned so that, when inserted into a pipeline, they are compressed to its inside diameter to support the pig. The overall diameters of the cups 36 and 38 are slightly larger than that of the interior of the pipe. Thus, the cups 36, 38 are sealably engaged to the interior of the pipe during operation. A plurality of holes in the rear cup 38 allow the flow of fluid 16 to pass therethrough. Such flow is only interrupted by the "unperforated" front cup 36. The pressure of the fluid 16 thus acts against the cup 36 to "pull" the pig through the pipeline. By so arranging the pig's propulsion mechanism, it attains enhanced maneuverability as opposed to that of a pig "pushed" through a pipeline by a flow of fluid 16 that acts against the rear cup 38.

An inertial navigation unit 44 that serves as the pig's attitute-and-reference heading system 20 is fixed to a shelf 46 within the fore section of the pig 10. The navigation unit 44 is a stapdown system that senses and provides pig attitude data with respect to inertial space. The navigation unit 44 is can be an LN-90B ring laser gyro inertial navigation system that is commercially available from Litton Systems Inc., Guidance and Control Systems Division, Woodland Hills, Calif. Such a system features a ring laser gyro that provides accurate 3-axis angular motion sensing. The unit 44 includes an electronic complex capable of data recording.

Figure 3:
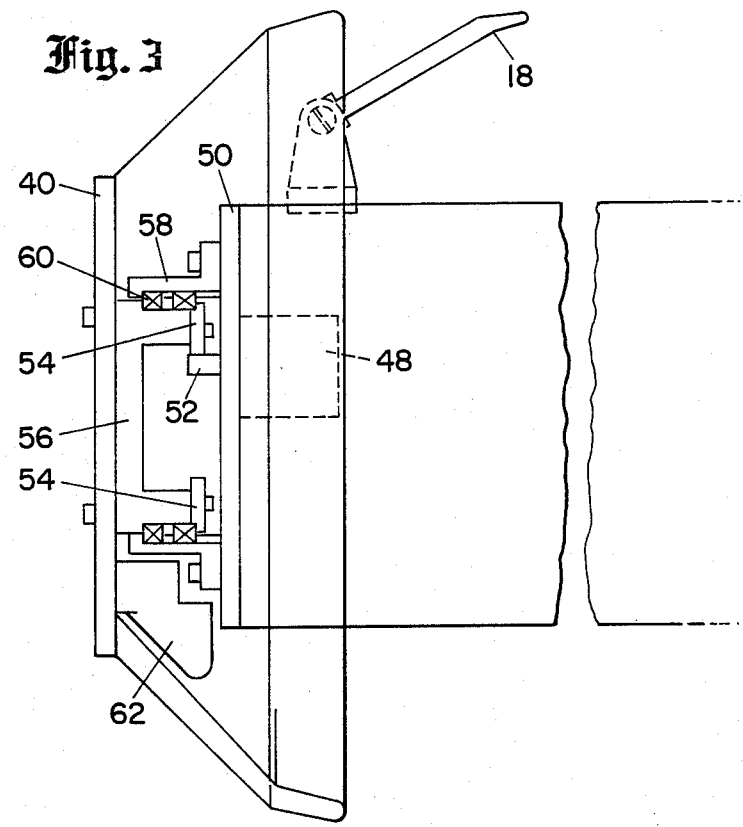
FIG. 3 is an enlarged side sectional view in detail of the front portion of a pig in accordance with the invention.

A servo motor 48, which receives roll stabilization signals from the inertial navigation unit 44, is bolted to a front plate 50 of the pig 10. Referring to FIG. 3, an enlarged partial view of the front of the pig 10, one can see that a geared output shaft 52 of the motor 48 extends through the front plate 50, engaging an interiorly toothed ring gear 54. The front end plate 40 is bolted to a donut-like support 56 which is moveable relative to a bearing support housing 58 fixed to the front plate 50. A bearing 60 inside the housing 58 facilitates relative movement between the plates 40 and 50. A ballast or counterbalance 62 is fixed to the front plate 40 so that, in conjunction with the friction of the end cups against the pipe walls, the servo motor 48 can react to maintain the pig upright. Both the front and rear cups employ identical end rings and bearing structures for roll stabilization purposes.

In FIG. 2 it can be seen that paired sensor assemblies 64, 66, 68 and 70 are located at the front and rear ends of the pig, respectively. Although not shown in FIG. 2, like paired assemblies, oriented 90° with respect to the assemblies shown in FIG. 2, are located at both the front and rear ends of the pig 10.

Each sensor assembly includes a spring-loaded arm. The assemblies are arranged so that their arms contact the interior wall of the pipeline to thereby provide continuous indications of relative orientation of pig 10 with respect to pipe interior. The measurements provided by the sensor assemblies are manipulated to determine pig-to-pipe attitude and position within the pipeline. A number of sensor assembly configurations may serve to provide pig-to-pipe orientation. Included among such configurations are synchro/resolvers integrated with spring-loaded sliding contacts or wheels on lever arms to measure the angle between the lever arm and the pig 10 and linear displacement tranducers which measure lever arm displacements relative to the pig. Pig-to-pipe pitch and azimuth data may be obtained in the latter instance from the separation differences between pig and pipe detected by front and rear sensor assemblies. (The orientation of sensor assemblies at 90° with respect to those shown in FIG. 2 allows the sensor system to detect azimuth in addition to pitch. The aforementioned role-stabilization apparatus assures that pig orientation is maintained throughout the pipeline to allow detection of "true" pig-to-pipe pitch and azimuth.)

Figure 4A:
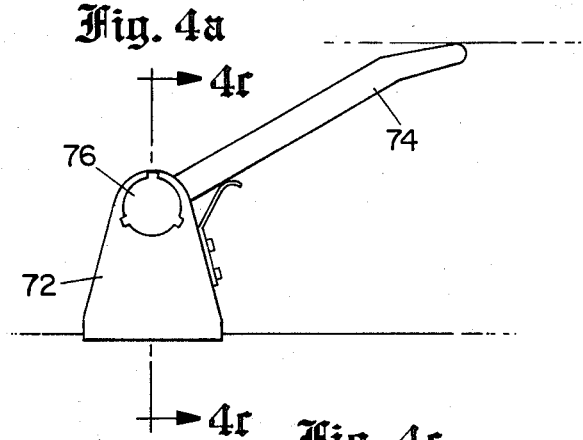
FIGS. 4a, 4b and 4c are side, front and cross sectional views, respectively, of a sensor in accordance with the invention.
Figure 4B:
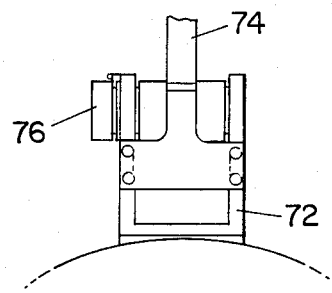
Figure 4C:
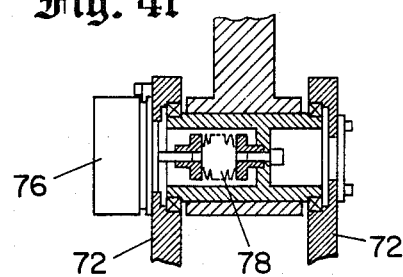

FIGS. 4a and 4b are side and rear views, respectively, of a resolve-type sensor assembly. Each of the eight sensor assemblies comprises a yoke 72, a spring-loaded sensing arm 74 and a resolver 76. FIG. 4c, an enlarged cross-sectional view of the sensor assembly taken along the line 4c—4c of FIG. 4a, shows that the resolver 76 includes a bellows coupling 78 for eliminating all eccentricities of the sensor arm and the resolver. The bellows 78 is very stiff in rotation but soft in translation, minimizing the importance of concentricities in design.

In addition to providing data for calculating pig-to-pipe attitude, sensor assemblies detect the position of the pig within the pipeline through detection of abrupt changes in pig-to-pipe interior spacing that occur periodically as the pig passes the weld points of the pipeline. Such points appear as voltage spikes in the output of the transducers associated with the sensor assemblies, thereby providing reference landmarks in the output data. The output of the inertial navigation unit 44 is appropriately synchronized to that of the sensor assemblies so that the position-sensing data can be applied to the pig's inertial attitude data to derive pipeline curvature with respect to inertial space at various positions.

Once again referring to FIG. 2, the power subsystem is shown to comprise a pair of batteries 80 and 82. The batteries are installed on a shelf 84 in the aft section of the pig housing 32. The bulkhead 34 separates this power support system from the sensor electronics. Power from the batteries is routed through a power harness that terminates in a bulkhead connector. An access door 86 at the top of the battery compartment allows access to a connector for recharging the batteries when the pig is dormant for any length of time.

A conventional recording electronics unit 88 and a tape transport unit 90 comprise the recording subsystem. The tape transport unit 90 is installed in a vertical position below an access plate 92 to allow removal of the tape cartridge for subsequent data processing. The electronics unit 88 is mounted near the inertial reference unit to minimize cable complexity.

In operation, the pig 10 as herein described is loaded into a pipeline at an appropriately-valved pig launcher. Once so situated, the it may traverse the length of the pipeline, being pulled therethrough by the force of the flowing fluid 16. As it travels through the pipeline, two sets of measurements are simultaneously recorded by the above-referenced recording subsystem. Pig-to-pipe attitude (pitch and azimuth) data is gathered through detection of the deflections of arms of the sensor assemblies that occur as pig-to-pipe attitude changes. Additionally, as mentioned above, the position of the pig in the pipeline is detected via the generation of the periodic spikes in sensor output that indicate passage through a weld point. (It may be noted that the locations of the welds need not be equally spaced; rather, as long the operator knows these points, positional data can be derived therefrom.)

At the same time that pig-to-pipe attitude is detected, the attitude of the pig with respect to inertial space is detected by means of the navigation unit 44. Both sets of attitude data are recorded by the recording subsystem and stored on tape for later off-line analysis by the data processing apparatus 12. The computation of the curvature of the pipe with respect to inertial space from the detected parameters is straightforward, involving merely calculation of the difference between the pig-to-pipe and pig-to-inertial space attitudes. To detect flexure along the pipeline, a plurality of "runs" are made over time. By utilizing the data from these runs and making comparisons therebetween, the operator can detect points of flexure in the pipeline from its time history. Such information regarding the behavior of the pipeline enables the operator to conduct repairs promptly, avoiding environmental damage and uneconomical repair modes. Additionally, assuming that the elastic modulus of a pipeline section is not exceeded, a section may be "sprung" and reinsered at a significant saving in repair cost.

Thus, it is seen that there has been brought to the pipeline monitoring art a new method and apparatus for detecting flexure. By utilizing the teachings herein, one may accurately and reliably locate stress points along a pipeline well in advance of the environmental degradation that can occur when such flexure is undetected.

It should be pointed out in relatively straight pipes the roll stabilization can be eliminated by making the pig pendulous so that it always goes down the pipe in the same fashion. In a similar fashion, one could eliminate the pig to pipe sensors by having the pig go down the same track of a pipe. In this case, the inertial navigation would measure the pipe deflection directly.

What is claimed is:

1. A method for monitoring curvature along a pipeline comprising the steps of:
    (a) taking a plurality of measurements of inertial pipeline attitude by (i) transporting a pig through said pipeline and (ii) measuring the attitude of said pig with respect to inertial space and with respect to said pipeline as it travels through said pipeline; then
    (iii) combining the pig-to-inertial space and pig-to-pipeline attitude measurements to derive the pipeline-to-inertial space attitude; then
    (b) comparing said plurality of measurements to locate changes in said attitude.

2. A method as defined in claim 1 wherein the step of measuring the attitude of said pig with respect to said pipe includes the steps of:
    (a) mounting at least one sensor for measuring the separation between said pig and the interior of said pipeline at each of a pair of locations along the length of said pig separated by a predetermined distance whereby at least one pair of separation measurements over a predetermined interval is provided along said pipeline; and
    (b) calculating the instantaneous slope of said pig with respect to said pipeline from said at least one pair of separation measurements.

3. A method as defined in claim 2 wherein:
    (a) each of said sensors includes a spring-loaded sensing arm; and
    (b) the instantaneous slope of said pig with respect to said pipeline is a function of the deflection differential between the sensing arms of said at least one pair of sensors.

4. A method as defined in claim 3 wherein the pig is transported through said pipeline by a flow of fluid therein.

5. Apparatus for monitoring curvature along a pipeline comprising, in combination:
    (a) means for taking a plurality of measurements of the inertial attitude of said pipeline said means including (i) a pig, (ii) means for measuring the attitude of said pig with respect to inertial space, (iii) means for measuring the attitude of said pig with respect to said pipeline and (iv) means for transporting said pig through said pipeline; and
    (b) means for comparing said measurements to locate changes in attitude along said pipeline.

6. Apparatus as defined in claim 5 further comprising means for deriving pipeline-to-inertial attitude from the attitudes of said pig with respect to said pipeline and with respect to inertial space.

7. Apparatus as defined in claim 6 wherein said means for measuring the attitude of said pig with respect to said pipeline includes:
    (a) at least one sensor for measuring the separation between said pig and the interior of said pipeline at each of a pair of locations along the length of said pig, said sensor locations being separated by a predetermined distance; and
    (b) means for calculating the instantaneous slope of said pig with respect to said pipeline from said at least one pair of separation measurements.

8. Apparatus as defined in claim 7 wherein each of said sensors includes a spring-loaded sensing arm.

9. Apparatus as defined in claim 8 wherein said means for transporting said pig includes at least one cup engaged to said pig.

10. Apparatus as defined in claim 9 wherein said pig includes means responsive to the force of gravity for stabilizing said pig.

11. A pig for measuring the curvature of a pipeline comprising:
    (a) a cylindrical pig housing;
    (b) at least one cup encircling said housing for translating a flow of fluid through said pipeline into motion of said pig; and (c) means for detecting the attitude of said pipeline with respect to inertial space, said means including (i) means for measuring the attitude of said pig with respect to inertial space and (ii) means for measuring the attitude of said pig with respect to said pipeline, said last named means including at least one sensor for measuring the separation between said pig and the interior of said pipeline at each of a pair of locations along the length of said pig, said sensor locations being separated by a predetermined distance.

12. A pig as defined in claim 11 wherein each of said sensors includes a spring-loaded sensing arm.

13. A pig as defined in claim 12 further including means responsive to the force of gravity for stabilizing said pig.

* * * * *